United States Patent

[11] 3,571,613

| [72] | Inventors | Walter J. Plate<br>Rye, N.Y.;<br>Edwin H. Arnaudin, Jr., Marion, Ind. |
|---|---|---|
| [21] | Appl. No. | 39,674 |
| [22] | Filed | May 20, 1970 |
| [45] | Patented | Mar. 23, 1971 |
| [73] | Assignee | Anaconda Wire and Cable Company |

[54] CABLE SYSTEM
9 Claims, 4 Drawing Figs.

[52] U.S. Cl. .................................... 307/147,
174/27, 174/107, 174/115
[51] Int. Cl. .......................................... H01b 11/02,
H02b 5/00, H02j 3/00
[50] Field of Search ................................. 174/115,
113, 102, 107, 102.2, 105.1, 27, 117; 307/147

[56] References Cited
UNITED STATES PATENTS
3,297,814 1/1967 McClean et al. ............... 174/115X

| 3,333,049 | 7/1967 | Humphrey et al. | 174/102 |
| 3,351,706 | 10/1967 | Gnerre et al. | 174/107X |
| 3,474,189 | 10/1969 | Plate et al. | 174/115 |

FOREIGN PATENTS
| 281,256 | 2/1952 | Switzerland | 174/15 |

OTHER REFERENCES
Bentzen-Bilkvist, IB Sodium Conductors for Power Distribution. In Electrical Construction and Maintenance Vol 68, No 12: pp. 76— 78, 97. December 1969 (copy in 174-Sodium)

*Primary Examiner*—Lewis H. Myers
*Assistant Examiner*—A. T. Grimley
*Attorney*—Victor F. Volk ABSTRACT: A two-cable underground electrical distribution system for single phase has an insulated power conductor with longitudinal bosses in the jacket into which are embedded no more than four undulatory drain wires, and a separate or duplexed return conductor.

PATENTED MAR 23 1971  3,571,613

INVENTORS
WALTER J. PLATE
EDWIN H. ARNAUDIN, Jr.
BY  V F Voell

THEIR AGENT 3,571,613

CABLE SYSTEM

BACKGROUND OF THE INVENTION

In primary single-phase power distribution, underground, it is known to supply power through a fully insulated single conductor cable, and to employ wires helically wound around this cable as a combined neutral return, shield, and armor. For direct burial of the cables these helical neutral wires are copper since the employment of aluminum, although it would be less expensive, would introduce corrosion problems, aluminum being notoriously subject to corrosion under moist conditions in the absence of an oxidizing atmosphere capable of producing a protective layer of oxide. The copper neutral constitutes a significant portion of the cost of the cable but if aluminum is substituted for the copper, and protected from moisture by an outer polymeric sheath, this also is very costly. In U.S. Pat. No. 3,474,189, Plate et al. disclosed a cable construction, particularly adopted to three-phase distribution in which six undulatory neutral return wires are embedded in a semiconducting jacket. For three-phase service the use of an undulatory neutral return was satisfactory, but for single-phase underground distribution the requirement that the conductance of the neutral should equal the conductance of the power conductor has become standard. This would require a very heavy semiconducting jacket if embedded undulatory drain wires were used for the neutral, and we have found that a separate neutral is unexpectedly more economical. However, some drain wires are still required in the jacket to supply adequate drain current capacity.

SUMMARY

We have invented a new and useful two-cable underground single-phase distribution system comprising a power cable with a first elongated metallic conductor strand, preferably comprising sodium or aluminum, a layer of polymeric electrical insulation surrounding the strand and a protective jacket of semiconducting polymeric composition surrounding the layer of insulation. Essentially, the jacket comprises a plurality, no greater than four, of broad, lengthwise, integral bosses that have a combined area less than one-half the total surface area of the jacket. A plurality of undulatory drain wires are embedded in the bosses. The system also comprises a separate neutral return cable comprising a second elongated metallic conductor strand, preferably of aluminum or sodium, with electrical conductance substantially equal to the first strand. The power and return cables may be twisted together to form a duplex cable.

For our system we have invented an electric power cable comprising a metal conductor, an extruded layer of polymeric insulation surrounding the conductor, and an extruded semiconducting polymeric jacket, immediately surrounding the insulating layer. The jacket comprises a plurality, no greater than four, of integral longitudinal bosses with combined surface area no greater than half the total surface area of the jacket. An undulatory drain wire is embedded in each of the bosses. These wires are substantially circular in section with diameters that exceed the thickness of the jacket exclusive of the bosses. The planes of undulation of the drain wires are substantially normal to radii of the cable.

DETAILED DESCRIPTION OF A PREFERRED EMBODIMENT

Figure 1:
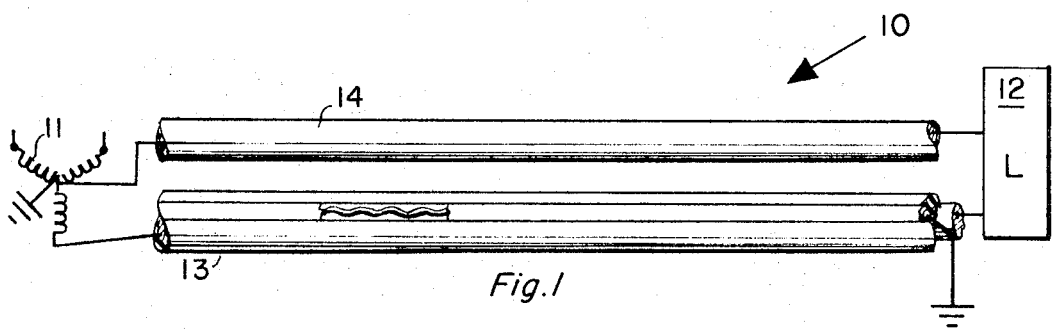
FIG. 1 shows a lengthwise view of the system of our invention.

A two-cable system, indicated generally by the numeral 10, carries single-phase electrical power from a source 11 to a load 12. The system is comprised of a power cable 13 and a return cable 14 with respective conductors 16 and 17 of approximately equal conductance. The conductor 16 may be stranded or solid copper or aluminum but may also be sodium or other conducting metal within the scope of our invention. The conductor 16 is covered with an extruded semiconducting strand shielding layer 18. This strand shielding layer may be omitted where the conductor 16 is sodium. It is essential to have void-free contact, preferably with a positive bond between the strand shielding layer 18 or conductor 16 and a covering insulation 19. This insulation, in the illustrated embodiment, is comprised of cross-linked polyethylene but it may comprise thermoplastic polyethylene, copolymers or terpolymers of polyethylene, polyvinyl chloride, or other polymeric materials. A jacket 21 of wear resistant semiconducting composition is tightly extruded over the insulation 19. This jacket not only protects the cable 13 mechanically but, being maintained at ground potential, it serves to symmetrize the electrical field and prevent corona or tracking of the outer surface of the insulation. A high enough conductance is required to quickly drain off induced surges from lightning or other sources. This conductance can be supplied, we have found, by embedding only 2,3, or 4 undulatory drain wires 22 having a diameter somewhat greater than the jacket wall thickness, in the jacket itself. To cover, or substantially cover, these drain wires, integral bosses 23 are extruded in the jacket 21 having a width great enough to include the spread of the undulations of the wires 22. These bosses provide ample embedment for the drain wires without excessively increasing the material cost of the jacket stock since the area of the combined surfaces of the bosses is only a fraction, always less than one-half, of the total area of the jacket. The combined area of the drain wires 22 is much less than the area of the conductor 16, and for purposes of conveying the neutral return current, the area of the separate conductor 17 is chosen to give the cable 14 approximately the same conductance as the cable 13. When the conductors 16,17 are both copper or aluminum they will have approximately the same areas, but if one is copper and the other aluminum or sodium the area of the latter will be greater in proportion to the relative conductivities of the two metals. The return conductors serve not only as coverings for the ground wires 22 but make the power cable 13 easily distinguishable from the cable 14 or other buried cables in the vicinity of the system 10. The economy of our cable system can be realized most advantageously by employing sodium for the conductor 16, aluminum for the drain wires 22 and sodium for the conductor 17. This becomes possible with our invention because the aluminum drain wires are protected from moisture by the covering bosses 23, and the separation of the return cable 17 frees it from the effects of load cycling which has been considered one of the obstacles to the use of sodium conductors.

Figure 4:
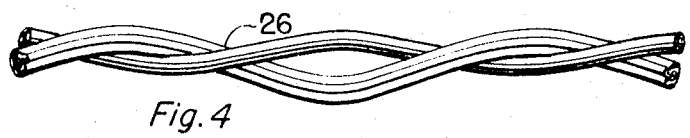
FIG. 4 shows a lengthwise view of a duplex cable of our invention.
Figure 2:
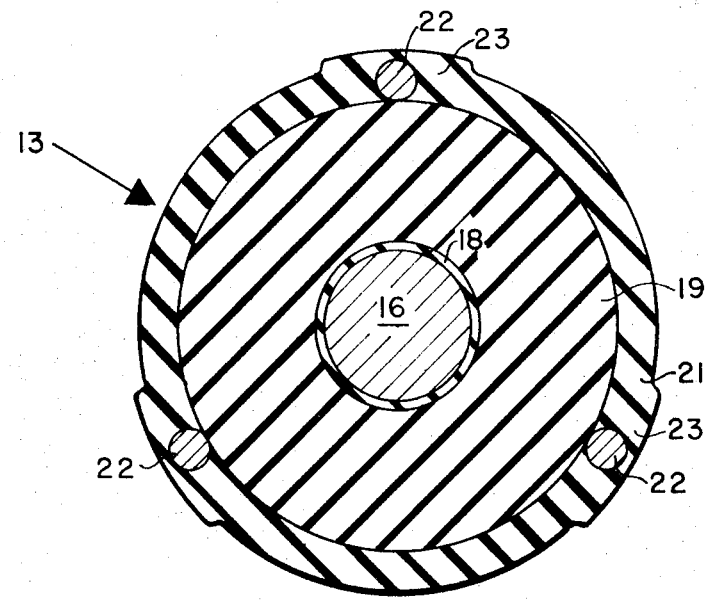
FIG. 2 shows an enlarged section of the power cable of FIG. 1.
Figure 3:
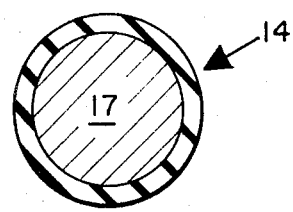
FIG. 3 shows an enlarged section of return cable of FIG. 1.

In FIG. 4 the power cable 16 and neutral return cable 17 are twisted together to form a duplex construction indicated generally by the numeral 26. Here the appearance and size of the two cables are so different that no further identification is required to distinguish the power cable from the neutral.

We have invented a new and useful electrical distribution system and cable of which the foregoing description has been exemplary, rather than definitive, and for which we desire an award of Letters Patent as defined in the following claims.

We claim:

1. A two-cable underground single-phase distribution system comprising:
    a. a power cable comprising:
        a. a first elongated metallic conductor strand;
        b. a layer of polymeric electrical insulation surrounding said strand;

c. a protective jacket of semiconducting polymeric composition surrounding said layer of insulation, said jacket comprising a plurality, no greater than four, of broad lengthwise integral bosses, said bosses comprising a combined area less than one-half the total surface area of said jacket; and d. a like plurality of undulatory drain wires embedded in said bosses;

b. a neutral return cable comprising a second elongated metallic conductor strand having electrical conductance substantially equal to said first stand, c. said return cable and power cable connected between a load and a power source.

2. The system of claim 1 wherein said return cable comprises a sodium conductor.

3. The system of claim 1 wherein said power cable comprises a sodium conductor.

4. The system of claim 1 wherein said power cable and said return cable are twisted together.

5. An electric power cable comprising:

A. a metallic conductor;

B. an extruded layer of polymeric insulation surrounding said conductor;

C. an extruded semiconducting polymeric jacket immediately surrounding said layer, said jacket comprising a plurality no greater than four of integral longitudinal bosses comprising a combined surface area no greater than half the total surface area of said jacket; and D. a like plurality of undulatory drain wires embedded in said bosses, said drain wires being of substantially circular section of a diameter exceeding the thickness of said jacket exclusive of said bosses, and the planes of undulation of said drain wire being substantially normal to radii of said cable.

6. The cable of claim 5 wherein said drain wires comprise copper.

7. The cable of claim 5 wherein said drain wires comprise aluminum.

8. The cable of claim 6 wherein said conductor comprises sodium.

9. The cable of claim 7 wherein said conductor comprises sodium.